United States Patent [19]

Kumai

[11] 4,078,381
[45] Mar. 14, 1978

[54] MANIFOLD TYPE THERMAL REACTOR

[75] Inventor: Teruo Kumai, Toyota, Japan

[73] Assignee: Toyota Jidosha Kogyo Kabushiki Kaisha, Japan

[21] Appl. No.: 704,919

[22] Filed: Jul. 13, 1976

[30] Foreign Application Priority Data

Apr. 6, 1976 Japan .................. 51-042554[U]

[51] Int. Cl.² .................................. F01N 3/10
[52] U.S. Cl. ............................... 60/282; 60/322
[58] Field of Search ................. 60/282, 322, 323

[56] References Cited

U.S. PATENT DOCUMENTS

| 3,653,205 | 4/1972 | Tadokoro | 60/322 |
| 3,703,083 | 11/1972 | Tadokoro | 60/282 |
| 3,991,566 | 11/1976 | Sami | 60/282 |

*Primary Examiner*—Douglas Hart
*Attorney, Agent, or Firm*—Browdy and Neimark

[57] ABSTRACT

A manifold type thermal reactor, for use in an internal combustion engine mounted on cars or other vehicles to collect exhaust gas from a plurality of engine cylinders into a reaction chamber is described. The chamber includes an external shell and an internal shell. The thermal reactor includes an external tubular pipe connecting at least one of the cylinders with the reactor and an inlet pipe connecting the tubular pipe with one of the openings formed in the internal shell. The angle between the axis of the inlet pipe and the axis of the internal shell is more than 0° and less than 90°. A gas-tight clearance is provided to allow sliding of the inlet pipe relative to a circular opening in the internal shell in the direction of the axis of the inlet pipe. A crescent-shaped clearance is formed between the external shell, having a cylindrical surface around a center line which is parallel with and apart a certain distance from the center line of the inlet pipe, and the external peripheral surface of the inlet pipe, and the external peripheral surface of the inlet pipe. The gas-tight clearance along with the crescent-shaped clearance will smoothly absorb the difference of the thermal expansion between the external shell and the internal shell by displacement of relative shell and the internal shell by displacement of relative position between the inlet pipe and the internal shell and by that between the inlet pipe and the external shell.

4 Claims, 8 Drawing Figures

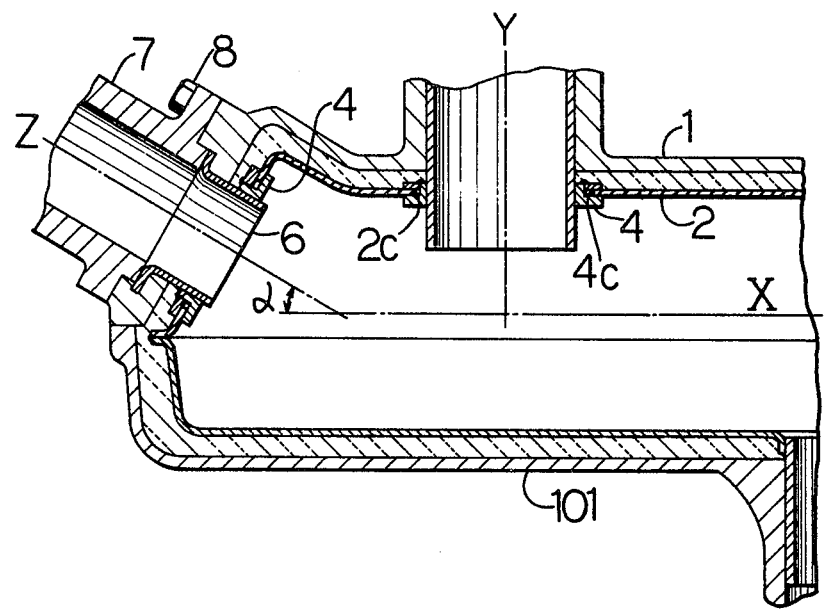
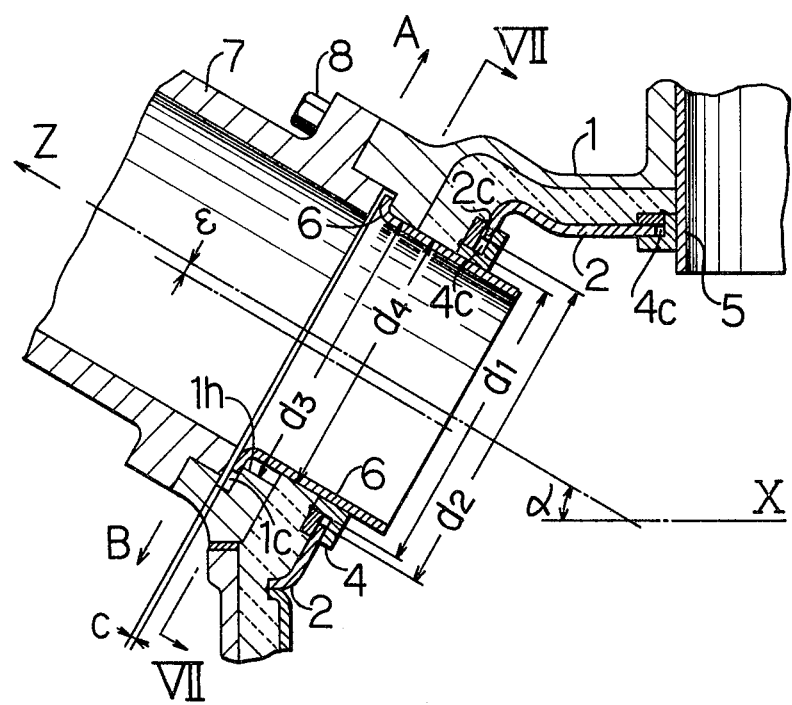

MANIFOLD TYPE THERMAL REACTOR

BACKGROUND OF THE INVENTION

The present invention relates to a structure of thermal reactors for use in an exhaust gas cleaning device of an internal combustion engine mounted on cars or other vehicles. More specifically, this invention aims at a provision of novel thermal reactors, particularly regarding manifold type ones collecting exhaust gas from a plurality of engine cylinders, provided with an external shell and an internal shell (core) and having to be so constructed as to receive a part of exhaust gas from some of cylinders at a certain angle less than 90° with the axis of the reactor due to the requirements of cylinder arrangement, which permit the thermal expansion of the core and yet perfectly maintain the tightness of exhaust gas.

Manifold type thermal reactors whereinto exhaust gas is collected from a plurality of engine cylinders to effect a high temperature oxidization reaction of the harmful HC, CO gases for discharging the same as harmless substances $CO_2$, $H_2O$ by utilizing the thermal energy of the exhaust gas itself have been known. These known reactors are provided with an external shell of cast iron and internal shell (called a core) of stainless steel.

Conventional reactors are required to be constructed, in many cases, to effect space saving or to conform to available space with the reactor positioned, with respect to some cylinders at an angle of less than 90° and greater than 0°. In these cases the thermal expansion often caused difficulties because of the fact that parts of the apparatus had different thermal expansion characteristics.

SUMMARY OF THE PRESENT INVENTION

It is the principal object of the present invention to solve the thermal expansion problem mentioned above the inherent in conventional thermal reactors of manifold type.

Thermal reactors of the manifold type for use in an internal combustion engine are mounted on cars or other vehicles. Such thermal reactors are provided with a tubular pipe or pipes connecting an engine cylinder (or cylinders) to the reaction chamber of the thermal reactor with a certain angle in the range of from 0° to 90° against the main body of the thermal reactor. In the conventional thermal reactors composed of an external shell, an internal shell, and some insulating material filled therebetween, the difference of the thermal expansion between the external shell and the internal shell (simply thermal expansion) can be smoothly absorbed only when the tubular pipe is connected to the main body of the thermal reactor at right angles. The present invention has solved the hard problem of smoothly absorbing the thermal expansion by disposing a crescent-shaped clearance between the external shell and the inlet pipe (and internal pipe connecting the tubular pipe to the internal shell of the main body of the thermal reactor) to allow the inlet pipe to displace for absorbing the thermal expansion, in addition to disposing of a gas-tight slidable clearance between the inlet pipe and the internal shell of the thermal reactor for absorbing a part of the thermal expansion.

BRIEF DESCRIPTION OF THE DRAWINGS

Structure, function, and effects of the present invention will be apparent from the following detailed description based on an embodiment taken in conjuction with the accompanying drawings, in which:

FIG. 5 is an enlarged view of the essential part of FIG. 4;

FIG. 6 is an enlarged view to a larger scale of the essential part of FIG. 5;

DETAILED DESCRIPTION OF THE PREFERRED EMBODIMENTS

Figure 1:
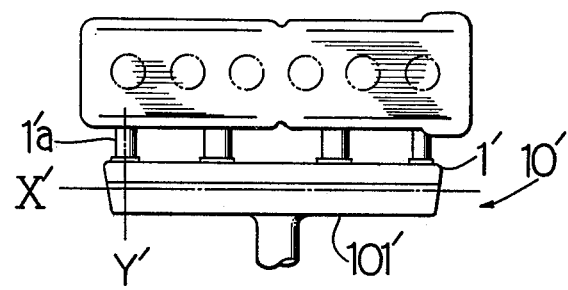
FIG. 1 is a general plan view of a conventional thermal reactor.
Figure 2:
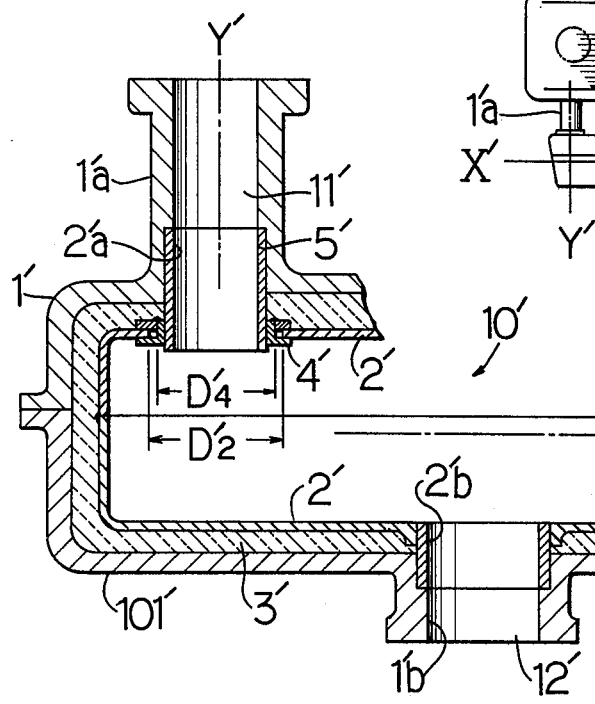
FIG. 2 is a horizontal sectional view of an essential part including the axis of FIG. 1.
Figure 3:
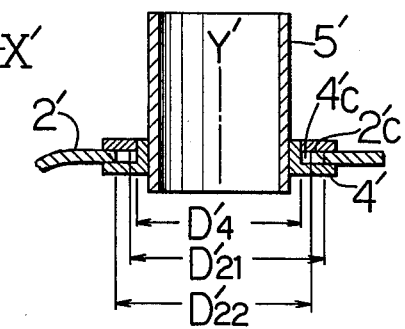
FIG. 3 is an explanatory view of the essential part of FIG. 2.

Before discussing the preferred embodiments, a typical conventional reactor is to be described, reference being made to FIGS. 1 - 3.

FIG. 1 is a general plan view, and FIG. 2 is a transverse sectional view of an essential part, of a typical conventional thermal reactor of manifold type. In these reactors the engine cylinders are arranged like in FIG. 1 and the exhaust gas produced in each cylinder of the engine is usually led into a thermal reactor through the route normal to the central line X' of the thermal reactor (a lengthwise central line of the internal shell, referred to hereinafter simply as the axis). Measures for maintaining the gas tightness not to allow the exhaust gas to leak while permitting the core of thermal expansion owing to the high temperature of the exhaust gas are all effected nearby the inlet to the thermal reactor introducing the exhaust gas from each cylinder.

This conventional structure is shown in FIG. 2; the thermal reactor 10' is mainly composed of an external shell 1' and 101' of a casting, a core of a sheet metal, and a heat insulating material 3' filled therebetween. The external shell 1' and 101' is splittably constructed, for example into two parts, for the convenience of accommodating the internal shell core 2'; a tube portion 11' having a center line Y' substantially perpendicular to the longitudinal center line X' of the thermal reactor, communicates the reactor with each of engine cylinders and is constituted of an external shell 1'a and a pipe portion 5' of the core (hereinafter simply referred to as the inlet pipe). Between the main body of the core 2' and the inlet pipe 5' is disposed a slidable collar 4' of U-shaped in section, which collar being provided with an annular groove 4'c for slidably receiving an opening 2'c of the core 2', to allow a thermal expansion as well as contraction of the core 2' in the direction of the axis X' of the reactor 10'. In each connecting portion between the cylinder and the reactor a similar structure is effected regardless of not being illustrated separately.

Since an exhaust outlet 2'b of the core 2' is fitted in an outlet 1'b of the external shell 101' at a discharging port 12' in a firm position state both axially and radially, the difference between the thermal expansion of the core 2' itself and that of the external shell 1' (hereinafter simply referred to as thermal expansion) is absorbed solely by each inlet pipe 2'a and slidable collar 4'. In other words, a thermal expansion in the direction of Y' is absorbed by sliding of the collar 4' on the circumferential surface of the inlet pipe 5'; and a thermal expansion in the axial direction X' of the core 2' is absorbed by the annular groove 4'c of the collar 4'. That is because the diameter $D'_2$ of the opening portion 2'c of the core (the diameter before expansion is assumed to be $D'_{21}$ and that after expansion is $D'_{22}$) is constantly larger than the diameter of the bottom $D'_4$ of the annular groove 4'c of the collar 4'; and although there is little difference in diameter $D'_2$ of the opening 2'c of the core 2', as shown in FIG. 3, between before and after the expansion of the reactor 10' ($D'_{22} \doteq D'_{22}$), the position is displaced as illustrated in the FIG. 3; and furthermore even when the displacement reaches the maximum possible extent the clearance between the opening 2'c of the core 2' and the bottom of the annular groove 4'c of the collar 4' is still maintained so as not to permit abutment of the two.

As stated in the above rather detailed explanation, the expansion and contraction both in the direction of X' and Y' can be absorbed as well-known with conventional thermal reactor 10'.

Thermal reactors are in some cases, in fact, required to be constructed in a manner such that, depending upon the space of the engine room or the convenience of arrangement of related mechanism, tube portions communicating some cylinders with the thermal reactor are laid at a certain angle $\alpha$ (90° > $\alpha$ > 0°) with the axis of the reactor.

The measures against the thermal expansion of conventional structure has been experimentally turned out to be improper or insufficient. The present invention is to provide a novel thermal reactor which has solved this very problem focalizing on the difficult structural design of the engine.

Description of the present invention is set out below in reference to the above described conventional device, wherein signs and numerals used in explaining the parts thereof will be used again upon removing the prime mark " ' " provided that they have the same function.

Figure 4:
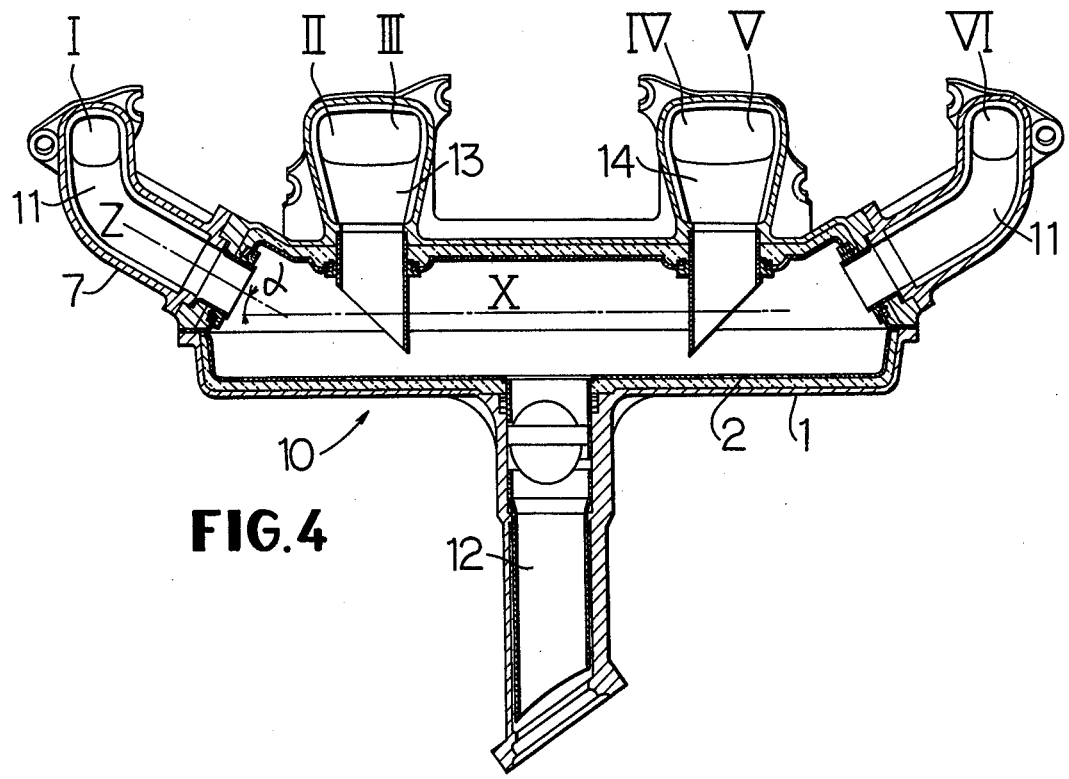
FIG. 4 is a horizontal sectional view of a type thermal reactor according to an illustrative embodiment of the present invention, including a showing of the axis of the thermal reactor.

According to the present invention, a thermal reactor 10 shown in FIG. 4 principally functions in and aims at, just like the conventional one, constituting a reaction chamber for burning the harmful gases HC and CO contained in the exhaust gas of an internal combustion engine to discharge them as harmless substances $H_2O$ and $CO_2$. From a structural point of view it is also similar to the conventional one, that is to say, composed of an external shell of cast iron, an internal core of stainless steel (core), and an adiabatic or heat insulating material filled therebetween.

As for measures for absorbing the difference in thermal expansion or contraction between an external shell 1 and a core 2, in tube portions 13 and 14 for connecting cylinders II, III and IV, V respectively the conventional structure is applied; in the tube portions 11, 11 connected to cylinders on either end I and IV respectively a newly invented art is employed, as the conventional one has been proved improper or unsatisfactory.

Inconveniences and shortcomings of the prior art thermal reactors can be assumed to result from the following circumstances: (a) thermal expansion of the core 2 mainly takes place in the direction of the axis X (Refer to FIG. 6); (b) as the tube portion 11, and consequently an inlet pipe 6 (5' in the conventional one in FIG. 2) also are slanted at the angle of $\alpha$, an expansion of the core 2 is forced to push a slidable collar 4 in the direction of the angle $\alpha$ (the direction of the axis Z) and to effect sliding of the core itself within the annular groove of the slidable collar 4; (c) if the slidable collar 4 be as it used to be, the relatively small dimension of guiding surface of the collar 4 (the dimension or length of the contact surface in the guiding direction) in comparison to its diameter is liable to cause a wrench or inclination in the contacting places. Even a slightest slant of the collar 4 against the inlet pipe and/or an opening portion 2c of th core 2 renders a smooth sliding therebetween impossible. Particularly in the fixed type inlet pipe, conventionally used, a smallest possible slanting between the same and the collar may decidedly hinder the sliding therebetween. Furthermore, the upper half and the lower half of the core 2, as shown in FIG. 4, are mostly asymmetrical or of complex shape, which naturally causes a complicated thermal expansion. The outer sliding surface of the inlet pipe 6 and the inner peripheral surface of the collar 4 must be made anti-wrench or anti-inclination in addition to the gas tightness therebetween; it is preferable that both are so constructed as to prevent or eliminate the possible causes beforehand. If measures against the thermal expansion according to the prior art be applied to this case, the slidable collar 4 must slide on the surface of the inlet pipe 6 in the direction of the slant axis Z, which means that the slidable collar 4 is able to move in the direction of A in FIG. 6 (in the upper direction normal to the axis Z) irrespective of the movement of the core 2 in the axial direction X. Such measures relying solely on the sliding displacement of the collar 4 on the surface of the inlet pipe for solving this problem are so unreasonable that a smooth sliding of the core 2 in the annular groove can not be assured particularly when the engagement between the collar and the opening portion of the core 2 is processed by welding on the spot.

The present invention has solved this problem by rendering a sliding displacement of the inlet pipe 6 in the direction of B in FIG. 6 possible. In a case wherein thermal expansion of the core 2 in the X direction tends to push the slidable collar 4 upwards in the Z direction along a surface of the inlet pipe 6, wrenching occurs in both the collar and inlet pipe, because in the A direction one sided press contact takes place and in the B direction a gap will be produced. This invention attempts to reasonably absorb the thermal expansion by depressing the inlet pipe 6 in the B direction just before the wrenching happens.

An embodiment of the above-mentioned solving measures will be described hereinunder. In order to permit the slidable collar 4 as well as the inlet pipe 6 of a slight displacement in a normal direction to the slant axis Z (a direction B reverse to the direction A marked with an arrow), as shown in FIG. 6, the inlet pipe 6 is provided with a flange 6a and at the connecting portion of the external shell 1 and a tubular portion 7 of the external shell is disposed a slight sliding clearance C in the axial direction of Z under the condition of preserving the gas-tightness, and in the direction of B normal to the axis Z an opening portion 1h (diameter $D_3$) is disposed in the external shell 1 having a radius ($d_4/2 + \epsilon$) larger than that of the inlet pipe 6 by an eccentricity $\epsilon$ (refer to FIG. 7), wherein the opening portion is described around the center line which is parallelly displaced from the original center line in the Z direction by ½ of the maximum required sliding length 2ϵ. There is, therefore, disposed a clearance of 2ϵ between the external shell 1 and the inlet pipe 6 in the flange 6J and the external shell 1, too, in FIG. 6.

FIG. 6 represents a state wherein the core 2 is not yet effected a thermal expansion, upon which a detailed description of this embodiment will be deployed.

Figure 7:
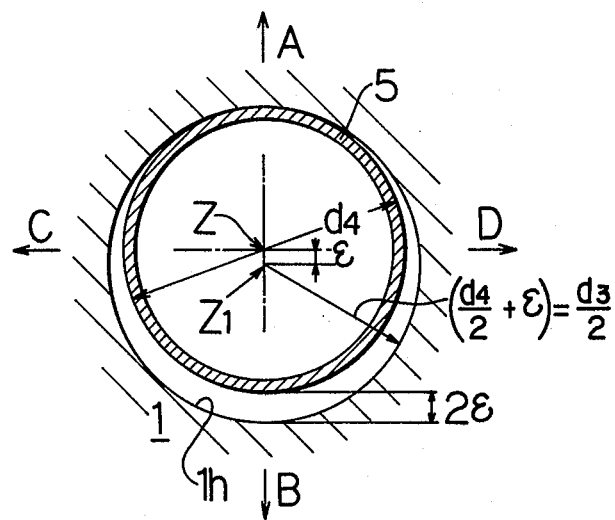
FIG. 7 is a transverse sectional view substantially along the line VII—VII of FIG. 6.
Figure 8:
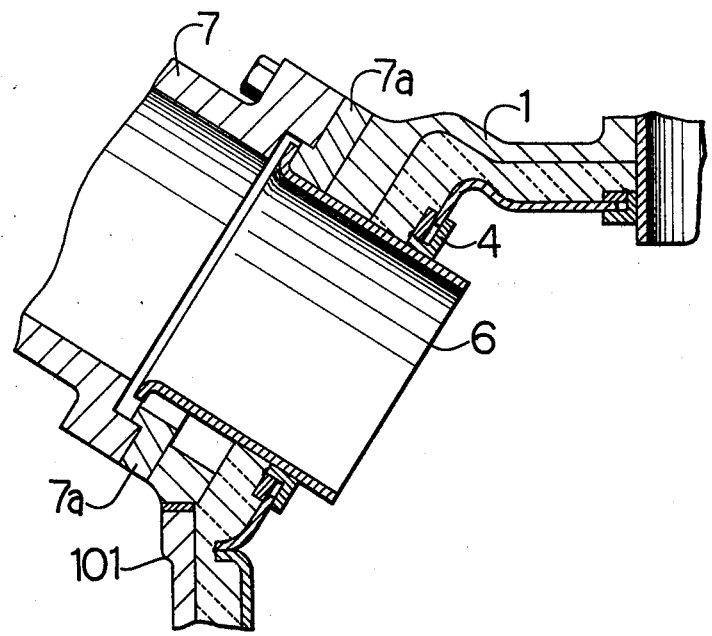
FIG. 8 is a sectional view similar to FIG. 6 illustrating another varient of a thermal reactor according to the present invention.

Two parts of a splittable external shell 1, 101 contain a core 2 therein and a tubular portion 7 of the external shell communicating to the cylinder of the engine (not shown) is fixed onto the external shell body to form a stepped fitting portion by means of a bolt 8 passing theough the flange portions of both. A spot facing 1c is disposed on the abutting side of the external shell 1 to accommodate the flange portion 6a of the inlet pipe 6. the size of the facing in the direction of Z is larger than the thickness of the flange 6a by the width of small clearance C; in the direction normal to Z, the body of the inlet pipe 6 and the opening portion 1h of the external shell 1 leave no gap therebetween, as can be seen in FIG. 7, twoard A direction, but are provided with a gap of 2ϵ toward B direction.

On the external periphery of the inlet pipe 6 is disposed a slidable collar 4 with a minute clearance of gas tightness. The collar 4 of U-shaped in section is formed by, for example, welding; the annular groove 4c of the collar 4 with a diameter $d_1$ at the bottom and the opening portion 2c of the core 2 with a diameter $d_2$ gas-tightly fitting into the annular groove 4c are disposed concentrically about the axis Z and for leaving some clearance therebetween, that is to say, $d_2 > d_1$ must be satisfied (this clearance may be as small as permitted depending on the requirement of manufacturing).

Now referring to FIG. 4 wherein a cylinder on either end of the engine is connected to the thermal reactor with a slant axis, operation effects will be described on the embodiment.

Introduction of exhaust gas from the engine is started at a state shown in FIG. 6; assume a case in which the core 2 is relatively expanded to the external shell owing to the difference in thermal expansion between the external shell 1 (or 101) and the core 2. In tubular pipe having the axis in the Y direction, an expansion in the axis Y direction is absorbed by a vertical sliding between the inlet pipe 6 and the slidable collar 4, and an expansion in the X direction is absorbed by a horizontal sliding between the opening portion 2c of the core 2 and the annular groove 4c of the slidable collar 4 just likewise in conventional devices.

In a tubular pipe disposed with a slant axis Z the thermal expansion of the core 2 can be thought to be treated by analyzing it into two parts, a displacement in the X direction and that in a direction normal to X; although the latter will not be discussed herein because it is relatively small, it is to be absorbed just in the same way as the former, that is, the expansion in the X direction, by analyzing the expansion into two, the Z direction and in a direction normal thereto.

In the former, an expansion in the X direction, the force works as a force which parallelly displaces the slidable collar 4 (hereinafter simply referred to as collar) and the inlet pipe 6 (hereinafter simply referred to as pipe) to the left in FIG. 6. This force can be thought to be equal to that the core 2 leftwardly presses the collar 4, as viewed in FIG. 6, then the collar 4 slides on the pipe 6 and the clearance between the collar 4 and the opening portion 2c of the core 2 in the annular groove 4c is gradually reduced on the upper side and is gradually increased on the lower side, as viewed in FIG. 6. On the upper side the collar 4 will not be allowed to advance, after the opening portion 2c of the core 2 has abutted the bottom of the annular groove 4c, unless the collar 4 depresses the pipe 6 downwards. In a case wherein the sliding displacement of the core 2 relative to the collar 4 is impossible owing to the manufacturing conditions, the thermal expansion may be thought to start from this state. In both aforementioned cases there is no problem in this embodiment because the pipe 6 is provided with a clearance (a crescent-shaped clearance in FIG. 7) permitting the same readily move in the downward direction as much as required (within the limit of 2ϵ). In the above discussion a sliding displacement in the annular groove 4c is described first only for the convenience of explanation. In reality, either of the sliding in the annular groove 4c or the downward movement of the pipe 6 may take place first depending on the magnitude of resistance; both may occur at a time; and the sliding in the annular groove 4c may not happen.

To sum up the description, this embodiment is characterized in that the general tendency of one sided press on the upper peripheral portion of the pipe 6 by the collar 4 displacing due to the expansion of the core 2 has been eliminated to allow the collar 4 to advance by permitting the pipe itself to easily move down-and-forwardly in a inclined posture. A smooth absorption of thermal expansion which has heretofore been hard in the conventional fixed type inlet pipe has become feasible by this invention.

Furthermore, since the clearance between the external shell 1 and the inlet pipe 6 is not an elliptic circle but an eccentric circle, it is effective in giving an appropriate amount of clearance (neither too much nor too little) in every direction, for example in directions C, D in FIG. 7, which has made an absorpiton of complicated thermal expansion feasible. And in addition, this clearance is very advantageous in that it can be processed satisfactorily in a single machining operation.

It will be obvious to those skilled in the art that various changes may be made without departing from the scope of the invention and the invention is not to be considered limited to what is shown in the drawings and described in the specification.

What is claimed is:

1. A manifold type thermal reactor for use in an internal combustion engine of vehicles collecting exhaust gas from a plurality of engine cylinders into a reaction chamber having an external shell and an internal shell to discharge the reacted gas, the thermal reactor comprising:

an external tubular portion connecting at least one of said cylinders and said reactor;

an inlet pipe having a shape of a cylinder with a flanged portion, normal to said inlet pipe, said inlet pipe connecting said tubular portion with an exhaust-gas inlet opening of said internal shell wherein the angle α between the axial direction Z of said inlet pipe and the longitudinal direction X of said internal shell is more than 0° and less than 90°;

a gas-tight slidable collar having an annular groove, said collar being slidably engaged with the outer surface of said inlet pipe at the internal diameter thereof and also slidably engaged with said opening of said internal shell in said annular groove thereof; and a crescent-shaped clearance formed on said external shell or portion connected to said external shell to allow said flanged portion of said inlet pipe to displace in the direction normal to said axial direction, said crescent-shaped clearance having the maximum breadth which is substantially equal to the maximum displacement difference, due to heat expansion, between said internal shell and said external shell in the direction normal to said axial direction Z.

2. A thermal reactor as claimed in claim 1, wherein said slidable collar has an annular groove clearance sufficient to absorb the maximum manufacturing dimensional tolerance against said exhaust-gas inlet opening of said internal shell.

3. A thermal reactor as claimed in claim 2, wherein said angle of $\alpha$ is substantially equal to 45°.

4. A thermal reactor as claimed in claim 1, wherein said flanged portion of said inlet pipe is slidably and gas tightly disposed between said tubular portion and said external shell.

* * * * *